US011831943B2

(12) United States Patent
Vicars-Harris et al.

(10) Patent No.: US 11,831,943 B2
(45) Date of Patent: Nov. 28, 2023

(54) SYNCHRONIZED PLAYBACK OF MEDIA CONTENT

(71) Applicant: Apple Inc., Cupertino, CA (US)

(72) Inventors: Nicholas Vicars-Harris, Cupertino, CA (US); Eric R. Seshens, Milpitas, CA (US); Joel Ostrowski, Copenhagen (DK); Thomas Alsina, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/665,407

(22) Filed: Feb. 4, 2022

(65) Prior Publication Data

US 2023/0129395 A1 Apr. 27, 2023

Related U.S. Application Data

(60) Provisional application No. 63/272,156, filed on Oct. 26, 2021.

(51) Int. Cl.
*H04N 21/43* (2011.01)
*H04N 21/439* (2011.01)
(Continued)

(52) U.S. Cl.
CPC ... *H04N 21/43076* (2020.08); *H04N 21/4394* (2013.01); *H04N 21/4405* (2013.01); *H04N 21/4627* (2013.01); *H04N 21/8456* (2013.01)

(58) Field of Classification Search
CPC ......... H04N 21/43076; H04N 21/4394; H04N 21/4405; H04N 21/4627; H04N 21/8456
See application file for complete search history.

(56) References Cited

U.S. PATENT DOCUMENTS 5,487,092 A * 1/1996 Finney ............... H04L 7/02
375/373
6,108,782 A * 8/2000 Fletcher ............. H04L 41/142
713/153

(Continued)

OTHER PUBLICATIONS

"Ongoing, adj." OED Online, Oxford University Press, Dec. 2022, www.oed.com/view/Entry/131429. Accessed Feb. 24, 2023. (Year: 2023).*

(Continued)

*Primary Examiner* — Michael B. Pierorazio
(74) *Attorney, Agent, or Firm* — BAKERHOSTETLER

(57) ABSTRACT

The subject technology provides for synchronized playback of different media content streams. The disclosed techniques may include determining, while certain audio content is being outputted, whether a triggering event has occurred at a media device. Responsive to a determination that the triggering event has occurred, audio information including identification information and a current output status of the audio content may be obtained, and a visual content stream for visual content corresponding to the audio content may be obtained. At the media device, the visual content stream may be processed based on the audio information to determine a starting time point indicating a time point within the visual content from which to start outputting the visual content. The visual content may be outputted such that the output of the visual content begins at the starting time point and is synchronized in time with the audio content.

20 Claims, 7 Drawing Sheets

(51) Int. Cl.
    *H04N 21/4405*     (2011.01)
    *H04N 21/4627*     (2011.01)
    *H04N 21/845*     (2011.01)

(56) References Cited

U.S. PATENT DOCUMENTS

| | | | | |
|---|---|---|---|---|
| 6,907,041 | B1* | 6/2005 | Turner | H04L 49/105 |
| | | | | 370/414 |
| 7,134,035 | B2* | 11/2006 | Sharma | G06F 1/12 |
| | | | | 713/400 |
| 7,424,080 | B1* | 9/2008 | Liu | H04N 21/4382 |
| | | | | 375/E7.278 |
| 8,290,423 | B2* | 10/2012 | Wang | H04B 17/23 |
| | | | | 455/2.01 |
| 8,923,141 | B2* | 12/2014 | Bryant | H04J 3/0679 |
| | | | | 370/252 |
| 9,058,135 | B1* | 6/2015 | Schumacher | G06F 1/10 |
| 9,628,851 | B2 | 4/2017 | Hu et al. | |
| 9,794,605 | B2 | 10/2017 | Lindahl et al. | |
| 9,832,248 | B2 | 11/2017 | Landais et al. | |
| 9,847,979 | B2 | 12/2017 | Peterka et al. | |
| 11,106,424 | B2 | 8/2021 | Millington et al. | |
| 2002/0059535 | A1* | 5/2002 | Bekritsky | H04B 7/2628 |
| | | | | 713/400 |
| 2006/0195780 | A1* | 8/2006 | Zuccolotto | G06F 40/18 |
| | | | | 715/273 |
| 2006/0203851 | A1* | 9/2006 | Eidson | H04J 3/085 |
| | | | | 370/503 |
| 2007/0124756 | A1* | 5/2007 | Covell | H04N 21/858 |
| | | | | 348/E7.071 |
| 2007/0297799 | A1* | 12/2007 | Tse-Au | H04Q 11/0005 |
| | | | | 398/58 |
| 2008/0069150 | A1* | 3/2008 | Badt | H04J 3/0667 |
| | | | | 370/252 |
| 2008/0082510 | A1* | 4/2008 | Wang | H04H 60/40 |
| 2010/0050853 | A1 | 3/2010 | Jean et al. | |
| 2010/0085989 | A1* | 4/2010 | Belhadj | H04J 3/0667 |
| | | | | 370/503 |
| 2010/0131464 | A1 | 5/2010 | Geleijnse | |
| 2010/0135314 | A1* | 6/2010 | Fourcand | H04J 3/1611 |
| | | | | 370/419 |
| 2010/0272102 | A1* | 10/2010 | Kobayashi | H04N 21/43632 |
| | | | | 370/389 |
| 2011/0164625 | A1* | 7/2011 | Fourcand | H04J 3/0667 |
| | | | | 370/498 |
| 2011/0202967 | A1* | 8/2011 | Hecht | H04N 21/854 |
| | | | | 725/114 |
| 2011/0276333 | A1 | 11/2011 | Wang et al. | |
| 2011/0286442 | A1* | 11/2011 | Maurice | H04W 56/0015 |
| | | | | 370/350 |
| 2011/0317991 | A1* | 12/2011 | Tsai | G03B 9/70 |
| | | | | 396/180 |
| 2012/0059845 | A1* | 3/2012 | Covell | H04N 5/445 |
| | | | | 707/769 |
| 2012/0249806 | A1* | 10/2012 | Gong | H04N 21/4788 |
| | | | | 348/E5.045 |
| 2012/0250704 | A1* | 10/2012 | Yamada | H04L 43/106 |
| | | | | 370/503 |
| 2012/0284434 | A1* | 11/2012 | Warren | G06F 13/00 |
| | | | | 710/22 |
| 2012/0331026 | A1* | 12/2012 | Menkhoff | H03H 17/0433 |
| | | | | 708/300 |
| 2013/0103861 | A1* | 4/2013 | Ahn | H04W 52/0261 |
| | | | | 710/14 |
| 2013/0185374 | A1* | 7/2013 | Fukasawa | H04L 67/00 |
| | | | | 709/208 |
| 2013/0194496 | A1* | 8/2013 | Atherton | H04N 21/242 |
| | | | | 348/E9.034 |
| 2013/0215753 | A1* | 8/2013 | Le Pallec | H04L 47/283 |
| | | | | 370/235 |
| 2014/0150021 | A1* | 5/2014 | Subramanian | H04N 21/235 |
| | | | | 725/36 |
| 2014/0165085 | A1* | 6/2014 | Karacali-Akyamac | |
| | | | | H04N 21/4788 |
| | | | | 725/14 |
| 2014/0196077 | A1* | 7/2014 | Gordon | H04N 21/23418 |
| | | | | 725/31 |
| 2017/0163955 | A1 | 6/2017 | Zehng | |
| 2018/0367839 | A1 | 12/2018 | Vandoros | |
| 2019/0058929 | A1* | 2/2019 | Young | H04N 21/235 |
| 2020/0314467 | A1* | 10/2020 | Goldrei | H04N 21/4341 |
| 2020/0404399 | A1 | 12/2020 | Gupta et al. | |

OTHER PUBLICATIONS

"Include, v." OED Online, Oxford University Press, Dec. 2022, www.oed.com/view/Entry/93571. Accessed Feb. 25, 2023. (Year: 2023).*

Extended European Search Report from European Patent Application No. 22199873.5, dated Jan. 18, 2023, 4 pages.

European Office Action from European Patent Application No. 22199873.5, dated Feb. 13, 2023, 6 pages.

* cited by examiner

SYNCHRONIZED PLAYBACK OF MEDIA CONTENT

CROSS REFERENCE TO RELATED APPLICATIONS

This application claims the benefit of priority to U.S. Provisional Patent Application No. 63/272,156, filed on Oct. 26, 2021, the disclosure of which is hereby incorporated herein in its entirety.

TECHNICAL FIELD

The present description relates generally to techniques for synchronizing media content streams, and, more particularly, for example, to techniques for synchronizing an audio content stream and a visual content stream.

BACKGROUND

Some electronic devices support playback of media content, e.g., using a media streaming service. The electronic devices may have limited hardware, firmware or software resources or capabilities to support playback of only audio content, but cannot provide concurrent, synchronized playback of both audio content and related visual (e.g., video) content.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
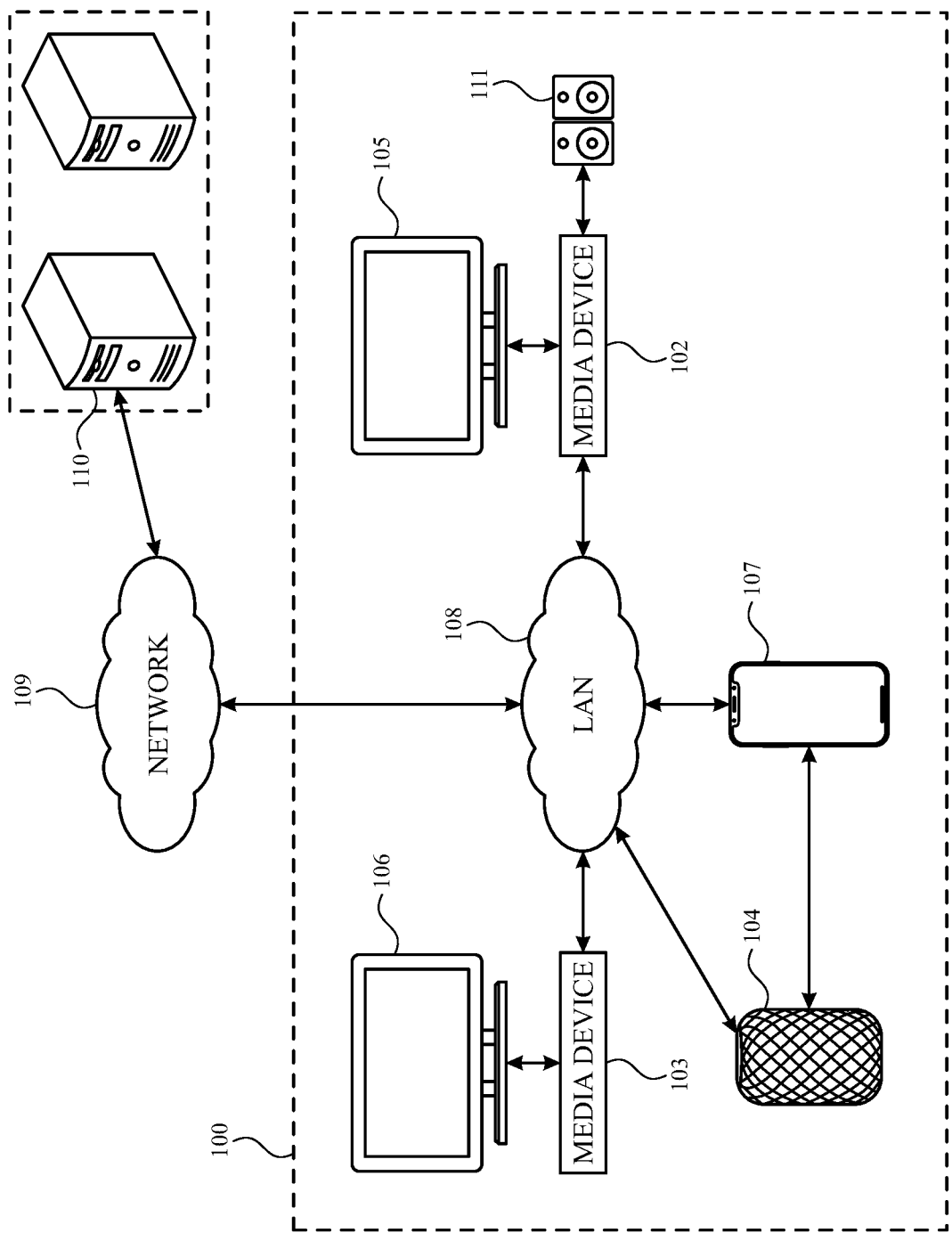
FIG. 1 illustrates an example network environment including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides a playback of visual (e.g., video) content synchronized with a preexisting or ongoing playback of audio content corresponding to the visual content, responsive to a triggering event at an electronic device executing the visual playback. In some implementations, the subject technology provides synchronized playback of visual and audio content with no perceivable disruption to the ongoing playback of the audio content. In some implementations, both the audio and video content may be processed and outputted (for playback) at the same electronic device. In some implementations, the audio content and the video content may be processed and outputted (for playback) at different electronic devices.

Some electronic device that are configured to process and output different types media content may be implemented such that a primary media content type (e.g., visual or video content) may be processed using a foreground/primary system process of the device's operating system, and a secondary media content type (e.g., audio content) may be processed using a background/secondary system process of the device's operating system. In such an electronic device, a synchronized playback of related audio content (e.g., a song) and video content (e.g., a music video corresponding to the song) using two different system processes of the device's operating system may not be possible at all or may not be possible without perceivable disruption to one of the digital content streams. Some other electronic devices may have the capability to support only one type media content. For example, a smart speaker may be configured to receive, process and output only audio content, e.g., via a streaming service.

To provide at a media device a playback of visual (e.g., video) content synchronized with a preexisting or ongoing playback of audio content, which corresponds to the visual content, the disclosed techniques include determining whether a triggering event has occurred at the media device, while the audio content is being outputted (e.g., via a speaker connected to or integrated within the media device). Responsive to a determination that the triggering event has occurred, audio information including identification information of the audio content and a current output status of the audio content may be obtained. Further, a visual content stream for the visual content corresponding to the audio content may be received from a content server at the media device, and processed based on the audio information to determine a starting time point. The starting time point may indicate a time point within the visual content from which to start outputting the visual content such that an output of the visual content is synchronized in time with an ongoing output of the audio content. Then, the visual content may be outputted (e.g., rendered and displayed on a display device) such that the output of the visual content begins at the starting time point and is synchronized in time with the ongoing output of the audio content.

In some implementations, the audio content is being outputted by the media device, and the triggering event includes termination of a certain application unrelated to the ongoing output of the audio content. In one or more implementations, an audio content may be received from the content server at the media device, and processed to generate the ongoing output of the audio content by the media device. The processing of the audio content may include decrypting the audio content stream based on a first encryption technique (e.g., related to a first DRM technique). The visual content stream may be processed, which includes decrypting the visual content stream, concurrently with decrypting the audio content stream, based on a second encryption technique (e.g., related to a second DRM technique), which is different from the first encryption technique.

In some implementations, the audio content is being outputted by a different media device other than the media device, and the triggering event includes activation at the media device of a certain application related to an application executing at the different media device facilitating the ongoing output of the audio content.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes media devices 102, 103, and 104 (hereinafter "the media devices 102-104"), display devices 105 and 106, a portable device 107, a local area network ("LAN") 108, a network 109, one or more content providers such as a content provider 110, and an audio output device 111. The number and types of devices and their arrangement depicted in the network environment 100 is not meant to be restrictive; the network environment 100 may include any number and other types of media devices, display devices, portable devices, content providers, and audio output devices, any of which may be connected directly or indirectly using any of different network technologies with other devices and components of the network environment 100 in a manner that is different from the depiction of FIG. 1.

The media device 102 may be a digital media player or a video game console. In some implementations, the media device 102 may process and output different types media content and may be implemented such that a primary media content type (e.g., visual/video content or video game content) is processed using a foreground/primary system process of the media device 102's operating system, and a secondary media content type (e.g., audio content) is processed using a background/secondary system process of the media device 102's operating system. In the exemplary scenario of the media device 102 being a video game console, the media device 102 may include one or more gaming applications that are configured to support and execute (single-player or multiplayer) video gaming sessions based on video games installed locally on the media device 102 and/or using a video game online platform or subscription service (e.g., hosted by the content provider 110). The media device 102 may also include applications using which a user of the media device 102 may access streaming media content such as streaming music and/or video content from, e.g., the content provider 110. The media device 102 may provide visual/video content (e.g., of a video game session) to the display device 105, which may be operationally connected with or integrated into the media device 102. The media device 102 may provide audio content (e.g., of a video game session or from streaming music) to the audio output device 111, which may be operationally connected with or integrated into the media device 102. In some implementations, the media device 102 may process and output streaming audio content concurrently with processing and outputting of visual/video content of a video game session. The media device 103 may be a digital media player, e.g., configured to receive digital data such as music and/or video and stream it to the display device 106 such as a television or other video display. In one or more implementations, the media devices 102 and 103 may be integrated into or separate from a corresponding display device.

In some implementations, the media devices 102 and 103 may be, for example, a portable computing device such as a laptop computer, a smartphone, a smart speaker, a peripheral device (e.g., a digital camera, headphones), a tablet device, a wearable device such as a smartwatch or a band, a connected home device, such as a wireless camera, a router and/or wireless access point, a wireless access device (e.g., a door lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, and/or other wireless radios. The media devices 102 and 103 may be, and/or may include all or part of, the device discussed below with respect to FIG. 2, and/or the electronic system discussed below with respect to FIG. 6.

By way of example, in FIG. 1, the media device 104 is depicted as a smart speaker and the portable device 107 is depicted as a smartphone with a touchscreen. However, that illustration is not intended to be limiting as the media device 104 and the portable device 107 may be, for example, a smartphone, a media hub, a portable computing device such as a laptop computer, a tablet device, a wearable device such as a smart watch, a smart band, and the like, any other appropriate device that includes, for example, a memory storing a virtual assistant application, processing circuitry and/or communications circuitry for obtaining (e.g., from content provider 110), processing, and outputting media content.

Although not visible in FIG. 1 (see, e.g., FIG. 2 and/or FIG. 6), one or more of the media devices 102-104 and the portable device 107 may include processing circuitry (e.g., including memory and/or one or more processors) and communications circuitry (e.g., one or more antennas, radio frequency circuits, etc.) for receiving and/or processing data, metadata, and/or media content from one or more of the other of the media devices 102-104 and the portable device 107, and/or the content provider 110. The processing circuitry of the media devices 102-104 and the portable device 107 may operate a speaker to generate sound according to the audio content and operate a display device to output an image or a video according to the image/video content. One or more of the media devices 102-104 and the portable device 107 may include communications circuitry for communications (e.g., directly or via the LAN 108 and/or the network 109) with another of the media devices 102-104 and the portable device 107, and/or the content provider 110. The communications circuitry may include, for example, one or more wireless interfaces, such as WLAN radios, cellular radios, Bluetooth radios, Zigbee radios, near field communication (NFC) radios, and/or other wireless radios.

By way of example, in FIG. 1, the display devices 105 and 106 are depicted as televisions or monitors, and the audio output device 111 is depicted as a pair of speakers. However, these depictions of the display devices 105 and 106 and the audio output device 111 are not meant to be limiting, and in general, one or more of the display devices 105 and 106 and the audio output device 111 may themselves be implemented as a media device capable of receiving audio and video content via, e.g., the content provider 110, and capable of outputting audio, video and/or other types of media. In some implementations, the audio output device 111 may be a speaker having no "smart" functionalities (e.g., in contrast to the media device 104, described above) or having a limited feature set than the media device 104. For example, the audio output device 111 may be a speaker fitted or otherwise operationally integrated into the media device 102. The audio output device 111 may include one or more audio transducers such as a speaker configured to output audio (e.g., from streaming music). The display devices 105 and 106 and the audio output device 111 may be, and/or may include all or part of, the device discussed below with respect to FIG. 2, and/or the electronic system discussed below with respect to FIG. 6.

Content provider 110 may provide access to content such as streaming content (e.g., video content, audio content) or other subscription-based content (e.g., video gaming content, electronic book content or the like) to user devices (e.g., to one or more of the media devices 102-104 and the portable device 107) that are associated with a user account that has been established with the content provider 110. In some implementations, the content provider 110 is configured to encrypt and/or decrypt content stored therein using one or more encryption techniques. The one or more encryption techniques may be based on corresponding digital rights management (DRM) techniques. In one or more implementations, the content provider 110 may encrypt and/or decrypt multiple copies of the same content using a plurality of encryption techniques, where each encrypted content copy corresponds to one of the plurality of encryption techniques. The content provider 110 may be configured to select and provide to a requesting media device an encrypted content copy (of the multiple copies) based on the type of the media device and/or an encryption or DRM technique supported by the requesting media device. One or more of the servers for content provider 110 may be, and/or may include all or part of the device discussed below with respect to FIG. 2, and/or the electronic system discussed below with respect to FIG. 6.

In one or more implementations, the LAN 108 and/or the network 109 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices. In one or more implementations, the network 109 may be an interconnected network of devices that may include, and/or may be communicatively coupled to, the Internet.

Figure 2:
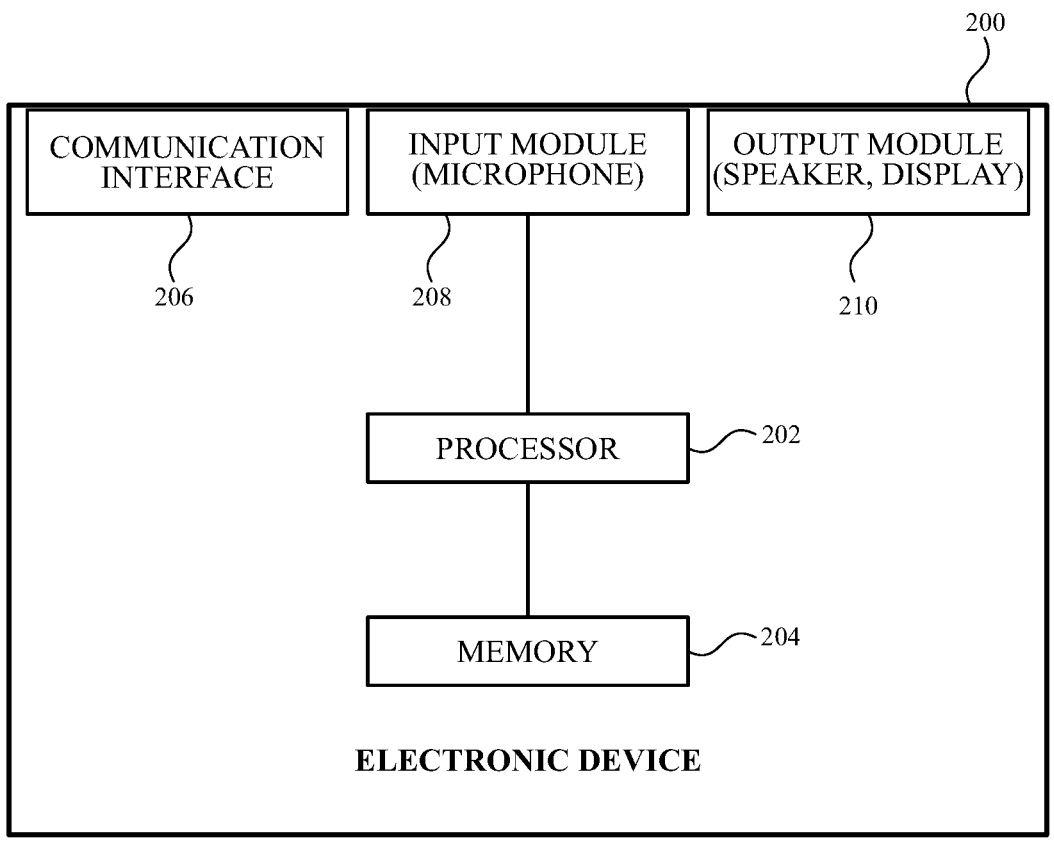
FIG. 2 illustrates an example electronic device that may be implemented in the subject system in accordance with one or more implementations.

FIG. 2 illustrates an example device that may implement a system for any of the devices depicted in FIG. 1 in accordance with one or more implementations. Not all of the depicted components may be used in all implementations, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206 and an input device or module 208, and an output device or module 210. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one or more of the media devices 102-104, the memory 204 may store identification information identifying the specific media content (audio, video, video game) that is being currently processed, executed and outputted by the corresponding media device. The memory 204 may also store information indicating a current output status (e.g., a timestamp relative to a starting time point when the content started playing) of the content being outputted by the corresponding media device. Further, the memory 204 may receive and store information related to one or more operational events related to the processing or outputting of the content at the corresponding media device and/or at another media device. The operational events may include, e.g., termination of an application using which the content was being outputted, starting of an application to request new streaming content, execution or activation of a playback control (e.g. pause, play, etc.). The memory 204 of the one or more of the media devices 102-104 and the portable device 107 may store user account and authentication information (e.g., a username and password) for a user for the device to establish a connection with and gain access to the content provided by the content provider 110.

The input device 208 may include suitable logic, circuitry, and/or code for capturing input, such as audio input (e.g., voice requests), remote control input, touchscreen input, keyboard input, etc. The output device 210 may include suitable logic, circuitry, and/or code for providing output, such as audio output (e.g., music), video output (e.g., a digital image or video), etc.

The communication interface 206 may include suitable logic, circuitry, and/or code that enables wired or wireless communication, such as between any of the devices shown in FIG. 1. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, the input device 208, the output module 210 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
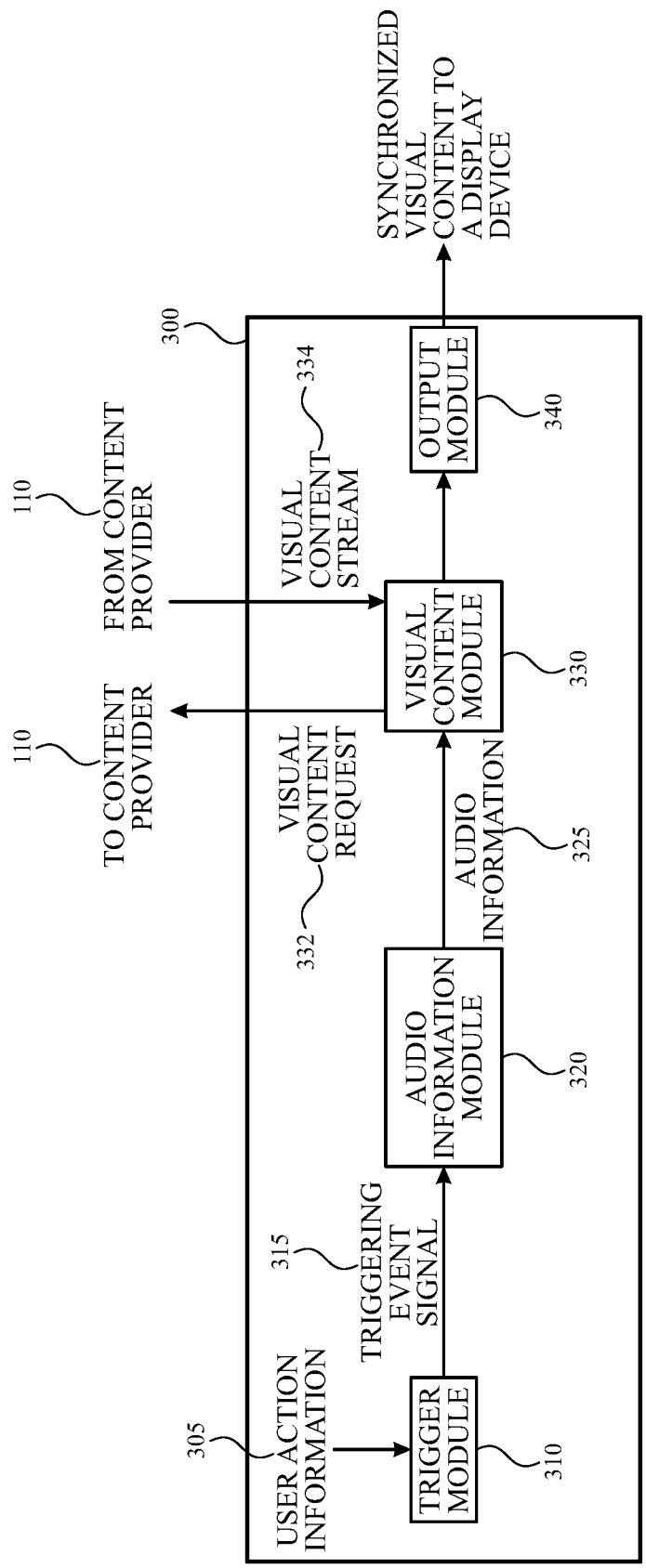
FIG. 3 illustrates an example system architecture that may be implemented in accordance with one or more implementations of the subject technology.

FIG. 3 illustrates an example system architecture 300 that may be implemented by the media device 102, the media device 103 or the portable device 107 in accordance with one or more implementations of the subject technology. For example, the system architecture 300 may implement techniques for providing a playback of visual (e.g., video) content synchronized with a preexisting, ongoing playback of audio content corresponding to the visual content, responsive to a triggering event at the device that is executing the visual playback. For explanatory purposes, the system architecture 300 is described below as being implemented based on the components of the electronic device 200, by using a processor and/or memory of the electronic device 200. However, not all of the depicted components may be used in all implementations, and one or more implementations may include additional or different components than those shown in the FIG. 3. Variations in the arrangement and type of the components may be made without departing from the spirit or scope of the claims as set forth herein. Additional components, different components, or fewer components may be provided.

Various portions of the system architecture 300 can be implemented in software or hardware, including by one or more processors and a memory device containing instructions, which when executed by the processor cause the processor to perform the operations described herein. In the exemplary implementation shown in FIG. 3, the system architecture 300 includes a trigger module 310, an audio information module 320, a visual content module 330, and an output module 340.

In one or more implementations, the trigger module 310 may receive and process user action information 305 to determine whether a triggering event has occurred at or in relation to a media device (e.g., the media device 102, the media device 103, or the portable device 107), while certain audio content is being outputted (e.g., while music from a streaming service is being played). Responsive to determination that the triggering event has occurred, the trigger module 310 may generate a triggering event signal 315 to provide to the audio information module 320, for example. In some implementations, the audio content is being outputted by the same media device where the triggering event occurs (and that includes the system architecture 300). The user action information 305 may include information of an affirmative user input at the media device to terminate or close a certain application (e.g., a video game application) unrelated to the ongoing output of the audio content (e.g., streaming music) and open another application related to the ongoing output of the audio content (e.g., a music application including user interface to play videos related to the audio content). In this example, the triggering event signal 315 may include information indicating both the termination of the certain application (e.g., the video game application) and the launch of the other application at the media device.

In some implementations, the audio content is being outputted by a different media device other than the device where the triggering event signal 315 occurs (and that includes the system architecture 300). For example, as discussed below in reference to FIG. 4B, the audio content may be outputted at the media device 104, and the system architecture 300 may be implemented and executed at the media device 103 or the portable device 107. In this scenario, the user action information 305 may include information of an affirmative user action of, e.g., switching ON the device (e.g., the media device 103 or the portable device 107) and activation or launch of a certain application related to the ongoing output of the audio content (e.g., a music application including user interface to play videos related to the audio content).

In one or more implementations, the audio information module 320 may receive the triggering event signal 315 and provide audio information 325 including identification information of the audio content (e.g., the title and/or the artist of a song being played) and a current output status of the audio content (e.g., a timestamp indicating a current position of the playback of the song). In some implementations (e.g., as described below in reference to FIG. 4A), the audio content is outputted by a background process executing on the media device 102 and the visual content is processed by an application process also executing on the media device 102 for the application related to the audio content. The application process is separate from the background process, and the audio information 325 is received by the application process from the background process, e.g., using a messaging process executing in accordance with the operating system of the media device 102.

In one or more implementations, the visual content module 330 may receive and process the audio information 325 from the audio information module 320 to identify visual content (e.g., a music video or graphical rendering of song lyrics) corresponding to the audio content being outputted (e.g., a song). The visual content module 330 may send a visual content request 332 to a content server, e.g., the content provider 110, to request the identified visual content. The visual content request 332 may include identification information of the audio content (from the audio information 325) and identification information of the visual content. The visual content request 332 may also include information identifying a DRM technique implemented at the requesting media device, so that the content provider 110 may provide a visual content stream encrypted in accordance with the identified DRM technique. Responsive to the request 332, the visual content module 330 may receive, from a content server (e.g., the content provider 110) at the media device, a visual content stream 334 for the identified visual content. Further, the visual content module 330 may process, at the media device, the visual content stream 334 based on the audio information to determine a starting time point indicating a time point within the visual content from which to start outputting the visual content such that an output of the visual content is synchronized in time with an ongoing output of the audio content.

In one or more implementations, the output module 340 may decrypt the visual content in the visual content stream 334 in accordance with an appropriate DRM technique and decode the decrypted visual content in accordance with appropriate video decoders. The output module 340 may then output to a display device the decoded visual content beginning at a point in the visual content stream that corresponds to the starting time point (as determined by the visual content module 330), and as such, the output of the visual content is synchronized in time with the ongoing output of the audio content. In some implementations, the visual content stream 334 includes, or is received from the content server with, a corresponding audio content stream. However, the output module 340 may effectively discard the audio content stream, and the audio content stream being decoded by the background process is used for synchronization with the visual content.

Figure 4A:
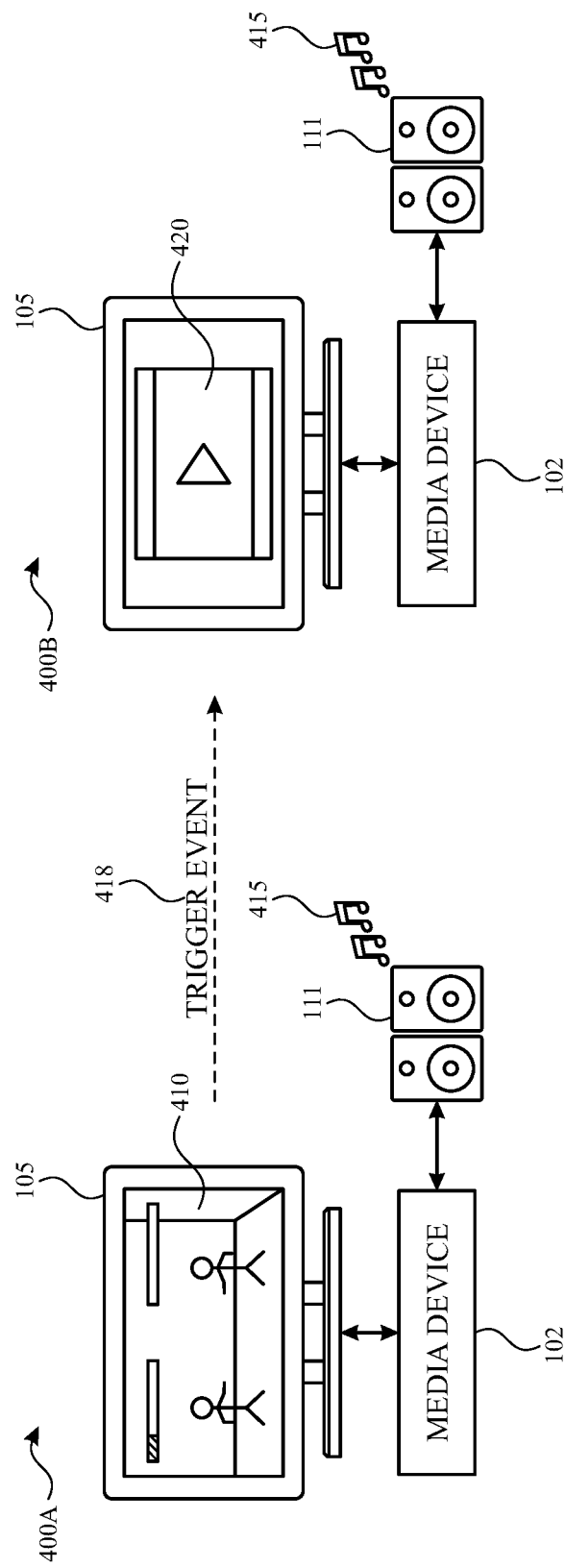
FIGS. 4A, 4B illustrate use cases of the subject technology in accordance with one or more implementations of the subject technology.

FIG. 4A depicts a use case of the subject technology in which synchronized playback of audio and visual content at the same media device is illustrated. For example, as shown in FIG. 4A, initially under instance 400A, the media device 102 (e.g., a video game console) may be executing a gaming application configured at the media device 102 and may be rendering a video game session 410 on the display device 105. Concurrently with the rendering of the video game session 410, the media device 102 may be accessing a streaming music service hosted at the content provider 110, receiving music content (e.g., a song) 415 from the streaming music service, and outputting the music content 415 via the audio output device 111. In some implementations, the media device 102 may be configured such that a primary media content type (e.g., visual/video content or video game content) is processed using a foreground/primary system process of the media device 102's operating system, and a secondary media content type (e.g., audio/music content) is processed using a background/secondary system process of the media device 102's operating system. With respect to these different system processes, majority of hardware, firmware and/or software resources of the media device 102 may be available to the foreground/primary system process for the visual/video content or video game content (e.g., the video game session 410), and only limited hardware, firmware and/or software resources may be available to the background/secondary system process for the music content 415.

In some implementations, as depicted in instance 400B of this example, while the music content 415 is being outputted, the user of the media device 102 may terminate the video game session 410 (which is content-wise unrelated to the music content 415) and activate a music application installed at the media device 102. The music application includes a user interface 420 to be displayed, e.g., at the display device 105, and is content-wise related to the streaming service used to provide the music content 415. For example, the user interface 420 of the music application may be used to play a music video or render graphics depicting text of lyrics corresponding to the music content 415. This user action of terminating the video game session and activating the music application may be included in the user action information 305 provided to the trigger module 310. In accordance with the techniques and the architecture discussed above with respect to FIG. 3, the trigger module 310 may receive and process the user action information 305 to determine whether a triggering event has occurred at the media device 102. Based on information indicating the above-described user action, the trigger module 310 may determine that a triggering event 418 has indeed occurred. Responsive to that determination, the trigger module 310 may generate a triggering event signal 315 to provide to the audio information module 320, for example.

In one or more implementations, the audio information module 320 may receive the triggering event signal 315 and provide audio information 325 including identification information of the music content 415 (e.g., the title and/or the artist of the music content 415) and a current output status of the music content 415 (e.g., a timestamp indicating a current position of the playback of the music content 415). In some implementations, the music content 415 is outputted by a background process executing on the media device 102 and the visual content (e.g., a music video) is processed by an application process also executing on the media device 102 for the music application related to the music content 415. The application process is separate from the background process, and the audio information 325 is received by the application process from the background process, e.g., using a messaging process executing in accordance with the operating system of the media device 102.

In one or more implementations, the visual content module 330 may receive and process the audio information 325 from the audio information module 320 to identify visual content (e.g., a music video or graphical rendering of song lyrics) corresponding to the music content 415. The visual content module 330 may receive at the media device 102 from the content provider 110, a visual content stream 334 for the identified visual content. Further, the visual content module 330 may process, at the media device 102, the visual content stream 334 based on the audio information to determine a starting time point indicating a time point within the visual content from which to start outputting the visual content such that an output of the visual content at the user interface 420 is synchronized in time with an ongoing output of the music content 415.

For example, in the audio information 325, the output status of the music content 415 at the time of the trigger event 418 may indicate a timestamp X seconds (e.g., 25 seconds) after the start of the playback of the music content 415. Using this timestamp information as well as based on the understanding that the music content 415 is still ongoing, the visual content module 330 may account for the lag (of Y seconds, e.g., 3 seconds) in identifying the relevant visual content and obtaining the visual content stream 334 and determine that the starting time point to output the visual content at the user interface 420 would be X+Y seconds from the actual beginning of the playback of the visual content. In other words, the visual content module 330 may determine that the visual content from the visual content stream 334 may be provided for rendering and displaying via the user interface 420 starting from a segment of the visual content that is X+Y seconds from the actual beginning (i.e., at the 0 second mark) of the visual content playback. In this way, the playback of the visual content at the user interface 420 is synchronized in time with the ongoing playback of the music content 415 at the audio output device 111. In one or more implementations, the output module 340 may decrypt the visual content in the visual content stream 334 in accordance with a first DRM technique native to the media device 102. The music content 415 may be decrypted in accordance with a second DRM technique, which is different from the first DRM technique.

Figure 4B:
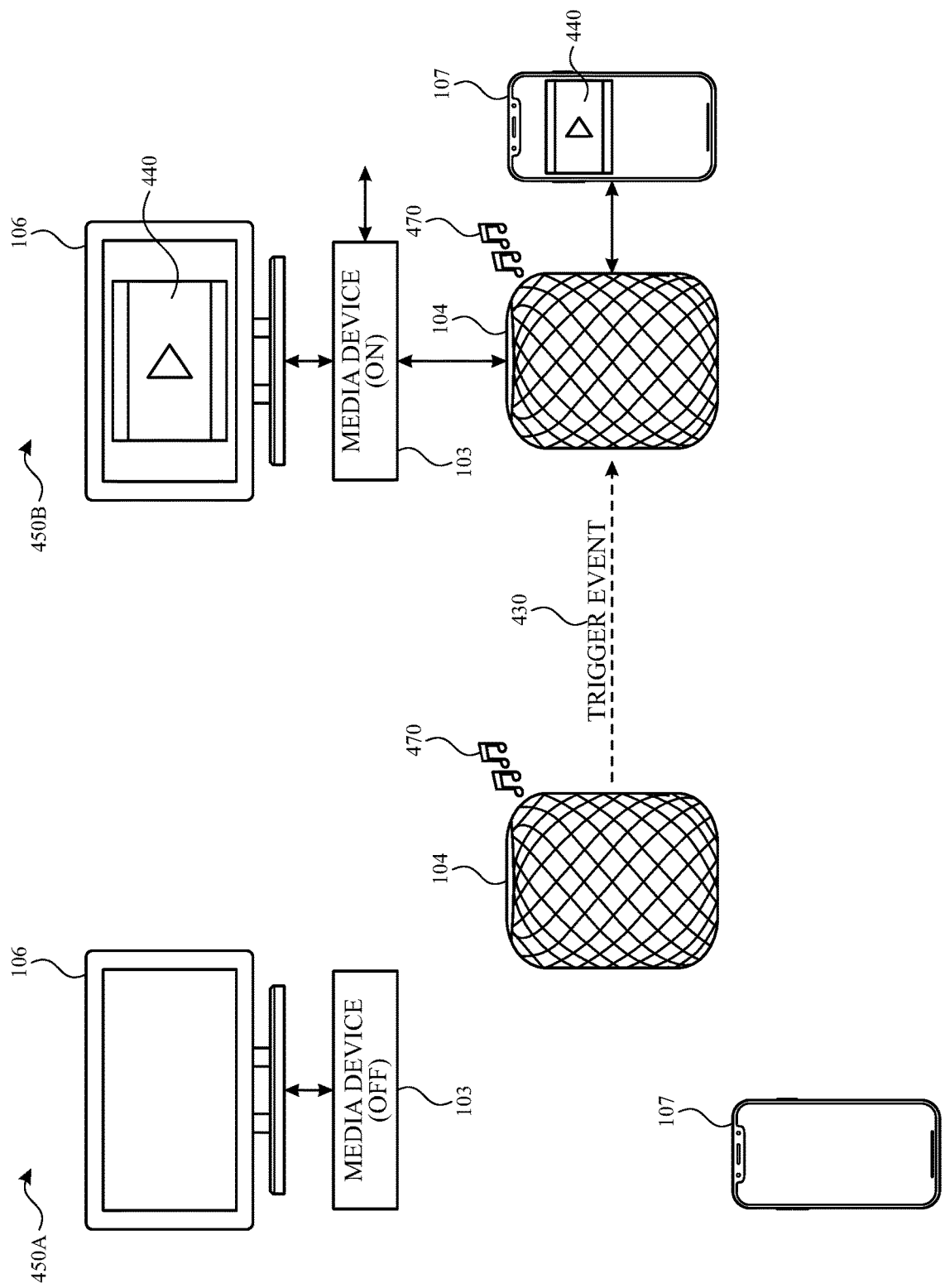

Referring to FIG. 4B, which illustrates another use case of the subject technology in which synchronized playback of audio and visual content at different devices is illustrated. For example, as shown in FIG. 4B, initially under instance 450A, the media device 104 may be accessing a streaming music service hosted at the content provider 110, receiving music content 470 (e.g., a song) from the streaming music service, and outputting the music content 470 from the speaker of the media device 104. The media device 103, which could be operationally and communicatively connected to the media device 104, may be switched off or may be in sleep or dormant state in which no application is being executed at the media device 103. Similarly, the portable device 107 may be relatively distant to each other such that the techniques of the subject technology are not activated at the portable device 107.

In some implementations, as depicted in instance 450B of this example, while the music content 470 is being outputted, the user of the media device 103 may switched on the media device 103 or may activate an application at the media device 103. As another example, while the music content 470 is being outputted, the user of the portable device 107 may bring the portable device 107 within a predefined distance from the media device 104 or touch the media device 104 with the portable device 107. Either of these two actions may activate an application at the portable device 107. The application activated at the media device 103 or at the portable device 107 may include a user interface 440 to be displayed, e.g., at the display device 106 or the display of the portable device 107, and is content-wise related to the streaming service used to provide the music content 470. For example, the user interface 440 of the application may be used to play a music video or render graphics depicting text of lyrics corresponding to the music content 470. This user action of activating the application at the media device 103 or the portable device 107 may be included in the user action information 305 provided to the trigger module 310. In accordance with the techniques and the architecture discussed above with respect to FIG. 3, the trigger module 310 may receive and process the user action information 305 to determine whether a triggering event has occurred at the media device 102. Based on information indicating the above-described user action, the trigger module 310 may determine that a triggering event 430 has indeed occurred. Responsive to that determination, the trigger module 310 may generate a triggering event signal 315 to provide to the audio information module 320, for example.

In one or more implementations, the audio information module 320 may receive the triggering event signal 315 and provide audio information 325 including identification information of the music content 470 (e.g., the title and/or the artist of the music content 470) and a current output status of the music content 470 (e.g., a timestamp indicating a current position of the playback of the music content 470).

In one or more implementations, the visual content module 330 may receive and process the audio information 325 from the audio information module 320 to identify visual content (e.g., a music video or graphical rendering of song lyrics) corresponding to the music content 470. The visual content module 330 may receive at the media device 103 or the portable device 107 from the content provider 110, a visual content stream 334 for the identified visual content. Further, the visual content module 330 may process the visual content stream 334 based on the audio information to determine a starting time point indicating a time point within the visual content from which to start outputting the visual content such that an output of the visual content at the user interface 440 is synchronized in time with an ongoing output of the music content 470 at the media device 104.

For example, in the audio information 325, the output status of the music content 470 at the time of the trigger event 430 may indicate a timestamp X seconds (e.g., 25 seconds) after the start of the playback of the music content 470. Using this timestamp information as well as based on the understanding that the music content 470 is still ongoing, the visual content module 330 may account for the lag (of Y seconds, e.g., 3 seconds) in identifying the relevant visual content and obtaining the visual content stream 334 and determine that the starting time point to output the visual content at the user interface 440 would be X+Y seconds from the actual beginning of the playback of the visual content. In other words, the visual content module 330 may determine that the visual content from the visual content stream 334 may be provided for rendering and displaying via the user interface 440 starting from a segment of the visual content that is X+Y seconds from the actual beginning (i.e., at the 0 second mark) of the visual content playback. In this way, the playback of the visual content at the user interface 440 is synchronized in time with the ongoing playback of the music content 470 at the media device 104. In one or more implementations, the output module 340 may decrypt the visual content in the visual content stream 334 in accordance with a first DRM technique native to the media device 103 or the portable device 107. The music content 470 may be decrypted in accordance with a second DRM technique, which may be the same as or different from the first DRM technique.

Figure 5:
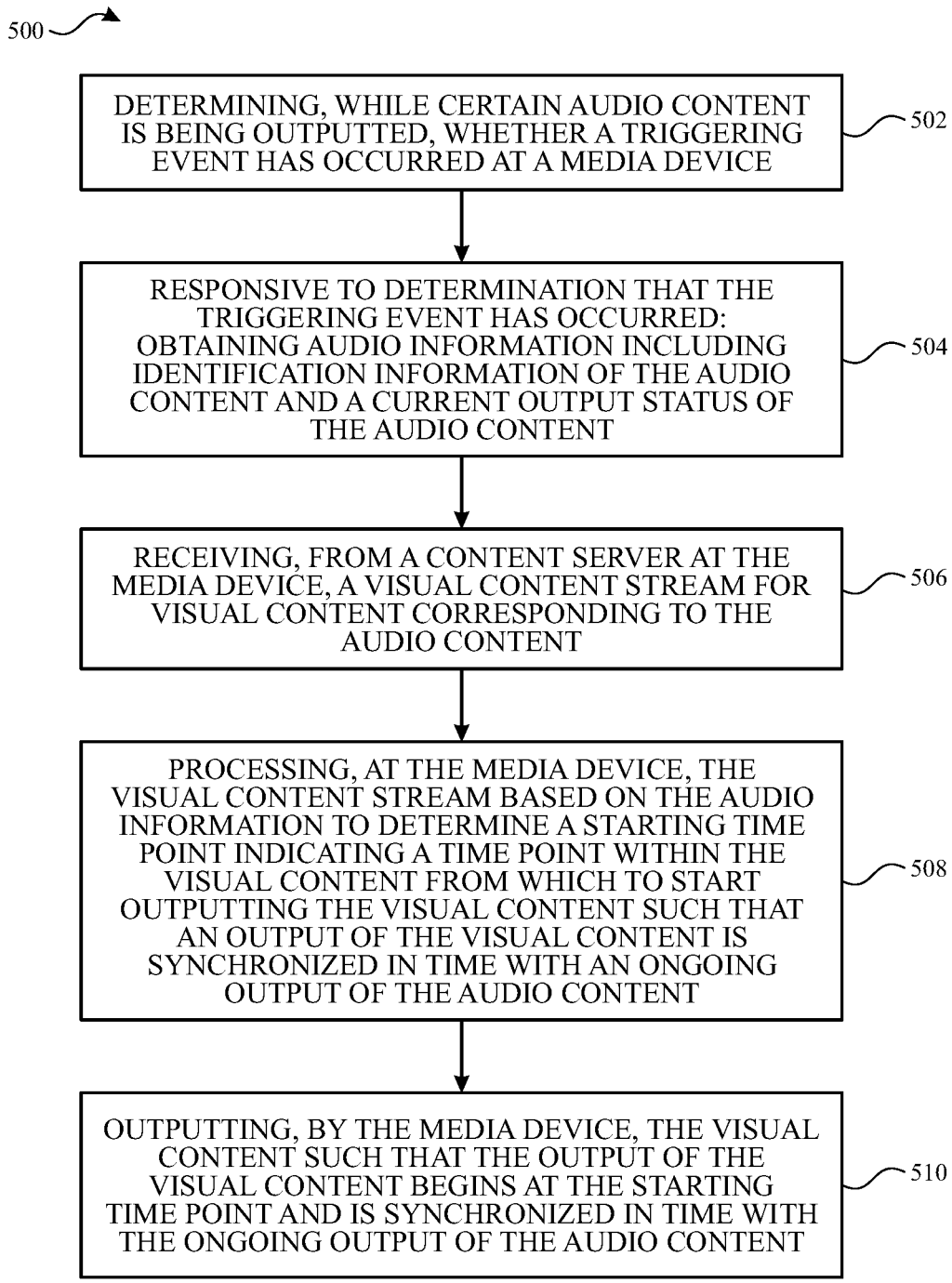
FIG. 5 illustrates a flow diagram for an example process in accordance with implementations of the subject technology.

FIG. 5 illustrates a flow diagram of an example process for providing a playback of visual (e.g., video) content synchronized with an ongoing playback of audio content corresponding to the visual content, responsive to a triggering event, in accordance with one or more implementations. For illustrative purposes, the process 500 is primarily described herein with reference to the system architecture 300 of FIG. 3. For illustrative purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In operation 502, the process 500 includes determining at the trigger module 310, while certain audio content is being outputted, whether a triggering event has occurred at a media device. In some implementations, the audio content is being outputted by the media device (e.g., the media device 102), and the triggering event includes termination of a certain application unrelated to the ongoing output of the audio content. In some implementations, the audio content is being outputted by a different media device (e.g., the media device 104) other than the media device (e.g., the media device 103 or the portable device 107). In that case, the triggering event includes activation at the media device of a certain application related to an application executing at the different media device facilitating the ongoing output of the audio content.

In operation 504, the process 500 includes, responsive to determination that the triggering event has occurred, obtaining by the audio information module 320 audio information including identification information of the audio content and a current output status of the audio content.

In operation 506, the process 500 includes receiving by the visual content module 330 from a content server, a visual content stream for visual content corresponding to the audio content. In operation 508, the process 500 includes processing by the visual content module 330, at the media device, the visual content stream based on the audio information to determine a starting time point indicating a time point within the visual content from which to start outputting the visual content such that an output of the visual content is synchronized in time with an ongoing output of the audio content.

In operation 510, the process 500 includes outputting, by the output module 340, the visual content such that the output of the visual content begins at the starting time point and is synchronized in time with the ongoing output of the audio content.

In some implementations, the process 500 may also include receiving, from the content server at the media device, an audio content stream, and processing, at the media device, the audio content stream to generate the ongoing output of the audio content by the media device. The processing of the audio content may include decrypting the audio content stream based on a first encryption technique (e.g., related to a first DRM technique). The process 500 may further include processing the visual content stream including decrypting the visual content stream, concurrently with decrypting the audio content stream, based on a second encryption technique (e.g., related to a second DRM technique), which is different from the first encryption technique.

As described above, one aspect of the present technology is the gathering and use of data available from specific and legitimate sources for training and/or operating machine learning models. The present disclosure contemplates that in some instances, this gathered data may include personal information data that uniquely identifies or can be used to identify a specific person. Such personal information data can include voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for recognizing a trigger phrase or determining details of a media content request from a voice input from a user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

Figure 6:
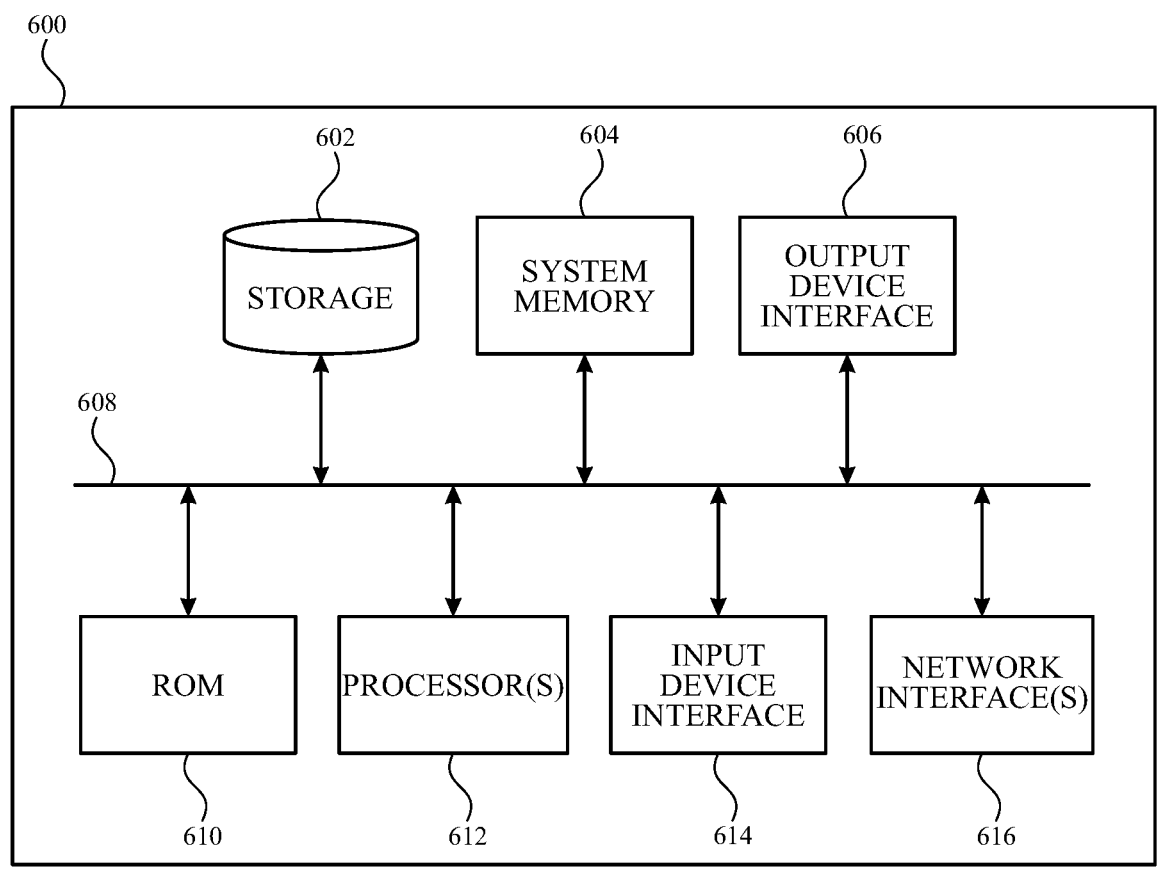
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of any device or system, as shown in FIGS. 1-4. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610 (which are each implemented as a non-transitory computer-readable medium). From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In accordance with aspects of the disclosure, a method is provided that includes determining, while certain audio content is being outputted, whether a triggering event has occurred at a media device; responsive to a determination that the triggering event has occurred: obtaining audio information including identification information of the audio content and a current output status of the audio content; receiving, from a content server at the media device, a visual content stream for visual content corresponding to the audio content; processing, at the media device, the visual content stream based on the audio information to determine a starting time point indicating a time point within the visual content from which to start outputting the visual content such that an output of the visual content is synchronized in time with an ongoing output of the audio content; and outputting, by the media device, the visual content such that the output of the visual content begins at the starting time point and is synchronized in time with the ongoing output of the audio content.

In accordance with aspects of the disclosure, a device is provided that includes at least one processor; and a memory including instructions for interacting with one or more accessory devices that, when executed by the at least one processor, cause the at least one processor to: determine, while certain audio content is being outputted, whether a triggering event has occurred at the device; responsive to a determination that the triggering event has occurred: obtain audio information including identification information of the audio content and a current output status of the audio content; receive, from a content server, a visual content stream for visual content corresponding to the audio content; process the visual content stream based on the audio information to determine a starting time point indicating a time point within the visual content from which to start outputting the visual content such that an output of the visual content is synchronized in time with an ongoing output of the audio content; and output the visual content such that the output of the visual content begins at the starting time point and is synchronized in time with the ongoing output of the audio content.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A method, comprising:
    determining, while certain audio content is being outputted, whether a triggering event has occurred at a media device, wherein the audio content is being outputted by a different media device other than the media device, and the triggering event includes activation at the media device of a certain application related to an application executing at the different media device facilitating an ongoing output of the audio content;
    responsive to a determination that the triggering event has occurred:

obtaining audio information including identification information of the audio content and a current output status of the audio content;

receiving, from a content server at the media device, a visual content stream for visual content corresponding to the audio content;

processing, at the media device, the visual content stream based on the audio information to determine a starting time point indicating a time point within the visual content from which to start outputting the visual content such that an output of the visual content is synchronized in time with the ongoing output of the audio content; and outputting, by the media device, the visual content such that the output of the visual content begins at the starting time point and is synchronized in time with the ongoing output of the audio content.

2. The method of claim 1, wherein the audio content is being outputted by the media device, and the triggering event includes termination of a certain application unrelated to the ongoing output of the audio content.

3. The method of claim 2, wherein the audio content is outputted by a background process executing on the media device and the visual content is outputted by an application process, separate from the background process, executing on the media device, and the audio information is received by the application process from the background process.

4. The method of claim 1, further comprising:

receiving, from the content server at the media device, an audio content stream; and processing, at the media device, the audio content stream to generate the ongoing output of the audio content by the media device.

5. The method of claim 4, further comprising:

processing the audio content stream including decrypting the audio content stream based on a first encryption technique; and processing the visual content stream including decrypting the visual content stream, concurrently with decrypting the audio content stream, based on a second encryption technique, which is different from the first encryption technique.

6. The method of claim 5, wherein the first and second encryption techniques are based on different digital rights management (DRM) techniques.

7. The method of claim 1, wherein the audio content includes a song and the visual content includes a music video of the song.

8. The method of claim 1, wherein the audio content includes a song and the visual content includes text of lyrics of the song.

9. A device, comprising:

at least one processor; and a memory including instructions that, when executed by the at least one processor, cause the at least one processor to:

determine, while certain audio content is being outputted, whether a triggering event has occurred at the device, wherein the audio content is being outputted by a different device other than the device, and the triggering event includes activation at the device of a certain application related to an application executing at the different device facilitating an ongoing output of the audio content;

responsive to a determination that the triggering event has occurred:

obtain audio information including identification information of the audio content and a current output status of the audio content;

receive, from a content server, a visual content stream for visual content corresponding to the audio content;

process the visual content stream based on the audio information to determine a starting time point indicating a time point within the visual content from which to start outputting the visual content such that an output of the visual content is synchronized in time with the ongoing output of the audio content; and output the visual content such that the output of the visual content begins at the starting time point and is synchronized in time with the ongoing output of the audio content.

10. The device of claim 9, wherein the audio content is being outputted by the device, and the triggering event includes termination of a certain application unrelated to the ongoing output of the audio content.

11. The device of claim 10, wherein the audio content is outputted by a background process executing on the device and the visual content is outputted by an application process, separate from the background process, executing on the device, and the audio information is received by the application process from the background process.

12. The device of claim 9, the instructions that, when executed by the at least one processor, further cause the at least one processor to:

receive, from the content server, an audio content stream; and process the audio content stream to generate the ongoing output of the audio content by the device.

13. The device of claim 12, the instructions that, when executed by the at least one processor, further cause the at least one processor to:

process the audio content stream by decrypting the audio content stream based on a first encryption technique; and process the visual content stream by decrypting the visual content stream, concurrently with decrypting the audio content stream, based on a second encryption technique, which is different from the first encryption technique.

14. The device of claim 13, wherein the first and second encryption techniques are based on different digital rights management (DRM) techniques.

15. A non-transitory computer-readable medium comprising instructions, which when executed by at least one computing device, cause the at least one computing device to perform operations comprising:

receiving, from a content server at a media device, an audio content stream comprising audio content;

processing, at the media device, the audio content stream to generate an ongoing output of the audio content by the media device, the processing the audio content including decrypting the audio content stream based on a first encryption technique;

determining, while the audio content is being outputted, whether a triggering event has occurred at a media device;

responsive to a determination that the triggering event has occurred:

obtaining audio information including identification information of the audio content and a current output status of the audio content;

receiving, from the content server at the media device, a visual content stream for visual content corresponding to the audio content;

processing, at the media device, the visual content stream based on the audio information to determine a starting time point indicating a time point within the visual content from which to start outputting the visual content such that an output of the visual content is synchronized in time with an ongoing output of the audio content, wherein processing, at the media device, the visual content stream comprises decrypting the visual content stream, concurrently with decrypting the audio content stream, based on a second encryption technique, which is different from the first encryption technique; and outputting, by the media device, the visual content such that the output of the visual content begins at the starting time point and is synchronized in time with the ongoing output of the audio content.

16. The non-transitory computer-readable medium of claim 15, wherein the audio content is being outputted by the media device, and the triggering event includes termination of a certain application unrelated to the ongoing output of the audio content.

17. The non-transitory computer-readable medium of claim 15, wherein the audio content is being outputted by a different media device other than the media device, and the triggering event includes activation at the media device of a certain application related to an application executing at the different media device facilitating the ongoing output of the audio content.

18. The non-transitory computer-readable medium of claim 15, wherein the audio content includes a song and the visual content includes a music video of the song.

19. The non-transitory computer-readable medium of claim 15, wherein the audio content includes a song and the visual content includes text of lyrics of the song.

20. The device of claim 9, wherein the audio content includes a song and the visual content includes text of lyrics of the song.

* * * * *